United States Patent
Callewaert et al.

(10) Patent No.: US 11,830,010 B2
(45) Date of Patent: Nov. 28, 2023

(54) WORKING-TIME-BASED ROUTING FOR CUSTOMER SUPPORT

(71) Applicant: Microsoft Technology Licensing, LLC

(72) Inventors: Francois Callewaert, Mountain View, CA (US); Cheng Wu, Redmond, WA (US); Dean Avila, Issaquah, WA (US); Sumit Manchanda, Kirkland, WA (US); Syed Masroor Hussain, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 16/737,845

(22) Filed: Jan. 8, 2020

(65) Prior Publication Data

US 2021/0209612 A1   Jul. 8, 2021

(51) Int. Cl.
*G06Q 30/016*  (2023.01)
*G06Q 10/0631*  (2023.01)
*G06Q 10/1091*  (2023.01)

(52) U.S. Cl.
CPC ..... *G06Q 30/016* (2013.01); *G06Q 10/06316* (2013.01); *G06Q 10/1091* (2013.01)

(58) Field of Classification Search
CPC ......... G06Q 10/06316; G06Q 10/1091; G06Q 10/06; G06Q 10/00; G06Q 30/016; G06Q 30/02

See application file for complete search history.

(56) References Cited

U.S. PATENT DOCUMENTS

| | | |
|---|---|---|
| 6,356,632 B1 | 3/2002 | Foster et al. |
| 6,535,600 B1 | 3/2003 | Fisher et al. |
| 8,718,271 B2 | 5/2014 | Spottiswoode |
| 10,152,718 B1* | 12/2018 | Janefalkar ............. G06F 21/629 |
| 10,313,527 B2 | 6/2019 | McCord |
| 2010/0211428 A1* | 8/2010 | Duffy ................. G06Q 10/1093 |
| | | 705/7.14 |

(Continued)

OTHER PUBLICATIONS

Sakchaikun et al., IT Help Desk Service Workflow Relationship with Process Mining, Nov. 1, 2018, 2018 16th International Conference on ICT and Knowledge Engineering, pp. 1-5 (Year: 2018).*

(Continued)

*Primary Examiner* — Robert D Rines
(74) *Attorney, Agent, or Firm* — NovoTechIP International PLLC

(57) ABSTRACT

Techniques performed by a data processing system for matching a customer service ambassador (CSA) with a customer include receiving a service request for technical assistance from the customer, analyzing estimated working hours information for the customer and estimated working hours information for each of the plurality of CSAs to produce a compatibility score for each CSA, the compatibility score for a respective one of the CSAs providing an indication of how closely the working hours of the customer and of the respective one of the CSAs align, reordering an available CSA queue identifying the plurality of CSAs based on the compatibility scores of each of the CSAs, and selecting a CSA from the queue to provide technical assistance to the customer.

17 Claims, 11 Drawing Sheets

(56) References Cited

U.S. PATENT DOCUMENTS

| | | | | |
|---|---|---|---|---|
| 2012/0101865 | A1* | 4/2012 | Zhakov | G06Q 10/06311 |
| | | | | 705/7.13 |
| 2015/0324806 | A1 | 11/2015 | Dashe et al. | |
| 2016/0364732 | A1* | 12/2016 | Jagatheesan | H04L 67/52 |
| 2017/0017964 | A1* | 1/2017 | Janefalkar | H04M 3/5232 |
| 2020/0364723 | A1* | 11/2020 | Gitlevich | G06Q 30/016 |
| 2021/0014136 | A1* | 1/2021 | Rath | H04L 41/5074 |
| 2021/0201359 | A1* | 7/2021 | Sekar | G06Q 30/01 |

OTHER PUBLICATIONS

Martin, Liam Mcivor., "The 2019 Clear and Complete Guide to Employee Monitoring", Retrieved From: https://biz30.timedoctor.com/employee-monitoring/, Retrieved on: Nov. 26, 2019, 37 Pages.

"International Search Report and Written Opinion Issued in PCT Application No. PCT/US20/061402", dated Jan. 29, 2021, 12 Pages.

* cited by examiner

| Identifier | 120A CSA120A 120A@m.net | 120B CSA120B 120B@m.net | 120C CSA120C 120c@m.net | 120D CSA120D 120d@m.net | 120E CSA120E 120E@m.net | 120F CSA120F 120f@m.net | 120G CSA120G 120g@m.net | 120H CSA120H 120h@m.net |
|---|---|---|---|---|---|---|---|---|
| 0 | 0 | 0 | 0 | 12 | 0 | 0 | 43 | 0 |
| 1 | 0 | 0 | 0 | 15 | 0 | 0 | 32 | 0 |
| 2 | 0 | 0 | 0 | 11 | 0 | 0 | 52 | 0 |
| 3 | 0 | 0 | 0 | 14 | 4 | 0 | 29 | 0 |
| 4 | 0 | 0 | 0 | 9 | 34 | 0 | 0 | 0 |
| 5 | 22 | 0 | 0 | 13 | 48 | 0 | 0 | 0 |
| 6 | 13 | 0 | 0 | 11 | 51 | 0 | 0 | 45 |
| 7 | 17 | 0 | 0 | 16 | 35 | 37 | 0 | 54 |
| 8 | 11 | 0 | 0 | 12 | 26 | 41 | 0 | 39 |
| 9 | 10 | 0 | 0 | 17 | 33 | 25 | 0 | 42 |
| 10 | 8 | 0 | 0 | 11 | 39 | 34 | 0 | 37 |
| 11 | 26 | 0 | 0 | 9 | 44 | 50 | 0 | 0 |
| 12 | 12 | 0 | 0 | 12 | 5 | 32 | 0 | 0 |
| 13 | 11 | 0 | 0 | 10 | 0 | 28 | 0 | 0 |
| 14 | 0 | 0 | 0 | 8 | 0 | 44 | 0 | 0 |
| 15 | 0 | 0 | 0 | 12 | 0 | 0 | 0 | 0 |
| 16 | 0 | 0 | 24 | 0 | 0 | 0 | 0 | 0 |
| 17 | 0 | 0 | 39 | 0 | 0 | 0 | 0 | 0 |
| 18 | 0 | 0 | 33 | 0 | 0 | 0 | 0 | 0 |
| 19 | 0 | 0 | 46 | 0 | 0 | 0 | 0 | 0 |
| 20 | 0 | 0 | 32 | 0 | 0 | 0 | 47 | 0 |
| 21 | 0 | 0 | 27 | 0 | 0 | 0 | 54 | 0 |
| 22 | 0 | 0 | 26 | 0 | 0 | 0 | 32 | 0 |
| 23 | 0 | 0 | 25 | 0 | 0 | 0 | 25 | 0 |
| Total Count | 130 | 0 | 252 | 192 | 319 | 291 | 314 | 217 |

| Identifier | 320A | 320B | 320C | 320D | 320E | 320F | 320G | 320H |
|---|---|---|---|---|---|---|---|---|
| 0 | 1445691 | 1765541 | 76456345 | 889666997 | 45994352 | 5569955 | 432523452 | 9757544 |
| 1 | 0 | 0 | 6 | 0 | 0 | 0 | 0 | 0 |
| 2 | 0 | 0 | 12 | 0 | 0 | 0 | 0 | 0 |
| 3 | 0 | 0 | 9 | 0 | 0 | 0 | 14 | 0 |
| 4 | 0 | 0 | 5 | 0 | 8 | 0 | 22 | 0 |
| 5 | 29 | 0 | 4 | 0 | 12 | 5 | 12 | 0 |
| 6 | 0 | 0 | 0 | 0 | 13 | 11 | 8 | 0 |
| 7 | 15 | 0 | 0 | 0 | 1 | 0 | 17 | 0 |
| 8 | 20 | 0 | 0 | 0 | 11 | 17 | 22 | 0 |
| 9 | 12 | 0 | 0 | 0 | 5 | 0 | 26 | 0 |
| 10 | 17 | 0 | 0 | 0 | 3 | 0 | 12 | 0 |
| 11 | 16 | 0 | 0 | 0 | 4 | 0 | 19 | 0 |
| 12 | 11 | 18 | 0 | 0 | 12 | 0 | 0 | 5 |
| 13 | 19 | 22 | 0 | 0 | 5 | 0 | 0 | 10 |
| 14 | 0 | 21 | 0 | 0 | 0 | 0 | 0 | 12 |
| 15 | 0 | 9 | 0 | 0 | 0 | 0 | 0 | 11 |
| 16 | 0 | 7 | 0 | 11 | 0 | 0 | 0 | 16 |
| 17 | 0 | 6 | 0 | 14 | 0 | 0 | 0 | 21 |
| 18 | 0 | 14 | 0 | 22 | 0 | 0 | 0 | 9 |
| 19 | 0 | 0 | 0 | 13 | 0 | 0 | 0 | 7 |
| 20 | 0 | 0 | 0 | 17 | 0 | 0 | 0 | 0 |
| 21 | 0 | 0 | 0 | 5 | 0 | 0 | 0 | 0 |
| 22 | 0 | 0 | 0 | 8 | 0 | 0 | 0 | 0 |
| 23 | 0 | 0 | 3 | 9 | 0 | 0 | 0 | 0 |
| Total Count | 139 | 97 | 39 | 99 | 74 | 33 | 152 | 74 |

| Identifier | 320A | 320B | 320C | 320D | 320E | 320F | 320G | 320H |
|---|---|---|---|---|---|---|---|---|
| 0 | 1445691 | 1765541 | 76456345 | 889666997 | 45994352 | 5569955 | 432523452 | 9757544 |
| 1 | 0 | 0 | 54 | 11 | 0 | 0 | 0 | 0 |
| 2 | 0 | 0 | 49 | 0 | 0 | 0 | 0 | 0 |
| 3 | 0 | 0 | 69 | 0 | 35 | 0 | 31 | 0 |
| 4 | 0 | 0 | 52 | 0 | 46 | 0 | 33 | 0 |
| 5 | 4 | 0 | 63 | 0 | 39 | 10 | 48 | 0 |
| 6 | 2 | 0 | 0 | 0 | 34 | 12 | 50 | 0 |
| 7 | 60 | 0 | 0 | 0 | 29 | 0 | 29 | 0 |
| 8 | 39 | 0 | 0 | 0 | 38 | 9 | 59 | 0 |
| 9 | 62 | 0 | 0 | 0 | 26 | 0 | 51 | 0 |
| 10 | 59 | 0 | 0 | 0 | 17 | 0 | 62 | 0 |
| 11 | 64 | 5 | 0 | 0 | 19 | 0 | 28 | 0 |
| 12 | 44 | 33 | 0 | 0 | 23 | 0 | 0 | 31 |
| 13 | 49 | 51 | 0 | 0 | 0 | 0 | 0 | 46 |
| 14 | 0 | 55 | 0 | 0 | 0 | 0 | 0 | 18 |
| 15 | 0 | 61 | 0 | 0 | 0 | 0 | 0 | 22 |
| 16 | 0 | 33 | 0 | 28 | 0 | 0 | 0 | 19 |
| 17 | 0 | 45 | 0 | 35 | 0 | 0 | 0 | 37 |
| 18 | 0 | 23 | 0 | 62 | 0 | 0 | 0 | 44 |
| 19 | 0 | 0 | 0 | 55 | 0 | 0 | 0 | 45 |
| 20 | 0 | 0 | 0 | 49 | 0 | 0 | 0 | 0 |
| 21 | 0 | 0 | 0 | 62 | 0 | 0 | 0 | 0 |
| 22 | 0 | 0 | 0 | 71 | 0 | 0 | 0 | 0 |
| 23 | 0 | 0 | 78 | 62 | 0 | 0 | 0 | 0 |
| Total Count | 383 | 306 | 365 | 435 | 306 | 31 | 391 | 262 |

305

| Identifier | 320A | 320B | 320C | 320D | 320E | 320F | 320G | 320H |
|---|---|---|---|---|---|---|---|---|
| 0 | 1445691 | 1765541 | 76456345 | 889666997 | 45994352 | 5569955 | 432523452 | 9757544 |
| 1 | 0 | 0 | 60 | 11 | 0 | 0 | 0 | 0 |
| 2 | 0 | 0 | 61 | 0 | 0 | 0 | 0 | 0 |
| 3 | 0 | 0 | 78 | 0 | 0 | 0 | 45 | 0 |
| 4 | 0 | 0 | 57 | 0 | 43 | 0 | 55 | 0 |
| 5 | 33 | 0 | 67 | 0 | 58 | 15 | 60 | 0 |
| 6 | 2 | 0 | 0 | 0 | 52 | 23 | 58 | 0 |
| 7 | 75 | 0 | 0 | 0 | 35 | 0 | 46 | 0 |
| 8 | 59 | 0 | 0 | 0 | 40 | 28 | 81 | 0 |
| 9 | 74 | 0 | 0 | 0 | 43 | 0 | 77 | 0 |
| 10 | 76 | 5 | 0 | 0 | 29 | 0 | 73 | 0 |
| 11 | 80 | 51 | 0 | 0 | 21 | 0 | 47 | 0 |
| 12 | 55 | 73 | 0 | 0 | 31 | 0 | 0 | 36 |
| 13 | 68 | 76 | 0 | 0 | 28 | 0 | 0 | 46 |
| 14 | 0 | 70 | 0 | 0 | 0 | 0 | 0 | 30 |
| 15 | 0 | 40 | 0 | 0 | 0 | 0 | 0 | 33 |
| 16 | 0 | 51 | 0 | 39 | 0 | 0 | 0 | 35 |
| 17 | 0 | 37 | 0 | 49 | 0 | 0 | 0 | 58 |
| 18 | 0 | 0 | 0 | 84 | 0 | 0 | 0 | 53 |
| 19 | 0 | 0 | 0 | 68 | 0 | 0 | 0 | 52 |
| 20 | 0 | 0 | 0 | 66 | 0 | 0 | 0 | 0 |
| 21 | 0 | 0 | 0 | 67 | 0 | 0 | 0 | 0 |
| 22 | 0 | 0 | 0 | 79 | 0 | 0 | 0 | 0 |
| 23 | 0 | 0 | 81 | 71 | 0 | 0 | 0 | 0 |
| Total Count | 522 | 403 | 404 | 534 | 380 | 64 | 543 | 343 |

Customer Activity Data 410

Customer ID: 1445691

| Entry Index | Product | User Action | Timestamp |
|---|---|---|---|
| 1 | CloudAdmin | login | 2019-12-03 11:04 UTC |
| 2 | CloudAdmin | create user account: user 1101 | 2019-12-03 11:11 UTC |
| 3 | CloudAdmin | modify privileges: user1101 | 2019-12-03 11:24 UTC |
| 4 | CloudAdmin | add user to group: group11 | 2019-12-03 11:26 UTC |
| 5 | CloudAdmin | add user to group: user11 | 2019-12-03 11:31 UTC |
| 6 | CloudAdmin | Modify privileges: user 1101 | 2019-12-03 11:33 UTC |

FIG. 4

CSA Activity Data 510

CSA ID: CSA120A

| Entry Index | Product | CSA Action | Timestamp |
|---|---|---|---|
| 1 | CloudAdmin | login | 2019-12-03 07:06 UTC |
| 2 | CloudAdmin | accept service request 32212 | 2019-12-03 07:12 UTC |
| 3 | CloudAdmin | call customer 32212 | 2019-12-03 7:20 UTC |
| 4 | CloudAdmin | login to customer database | 2019-12-03 7:26 UTC |
| 5 | CloudAdmin | modify misconfigured settings | 2019-12-03 7:41 UTC |
| 6 | CloudAdmin | logout: lunch | 2019-12-03 12:11 UTC |

FIG. 5

WORKING-TIME-BASED ROUTING FOR CUSTOMER SUPPORT

BACKGROUND

Customer support systems can match a customer requiring technical support with a support engineer, referred to herein as a "customer support ambassador" or "CSA." Conventional customer support systems typically match the first available CSA with the customer. However, this solution is not a good approach where there is a mismatch between the working hours of the customer and the working hours of the CSA. The CSA assigned to work with the customer to resolve a technical issue may have very different working hours than the customer to which the CSA was assigned. This can make direct communications and a rapid response to the customer's technical issue by the CSA difficult, if not impossible. For example, a service request received from a customer that is just starting their workday may be assigned to the first available CSA, but that CSA is at the end of their shift. If the CSA is unable to resolve the issue that caused the customer to submit the service request before the end of his or her shift, there may be a significant delay before the customer is able to obtain a resolution to the issue for which the service request was submitted. Thus, there are significant areas for new and approved mechanisms for routing customer service requests to a CSA that take into account the typical working hours of the customer and the CSA.

SUMMARY

An example data processing system according to the disclosure may include a processor and a computer-readable medium storing executable instructions. The instructions cause the processor to perform operations including receiving, via a network connection, a first signal comprising a service request for technical assistance from a customer, the service request including a customer identifier associated with the customer; accessing, from a memory of the data processing system, customer information data to obtain estimated working hours information for the customer; accessing, from the memory of the data processing system, information comprising a queue identifying a plurality of customer service ambassadors (CSAs) that are available to provide technical assistance to the customer and estimated working hours information for each of the plurality of CSAs; analyzing the estimated working hours information for the customer and the estimated working hours information for each of the plurality of CSAs to produce a compatibility score for each CSA, the compatibility score for a respective one of the CSAs providing an indication of how closely the working hours of the customer and of the respective one of the CSAs align; reordering the queue identifying the plurality of CSAs based on the compatibility scores of each of the CSAs; selecting a CSA from the queue to provide technical assistance to the customer; and sending, via the network connection, a second signal to the computing device of the CSA that includes an identification of the customer and the service request.

An example method performed by a data processing system for matching a customer service ambassador with a customer according to the disclosure includes receiving, via a network connection, a first signal comprising a service request for technical assistance from the customer, the service request including a customer identifier associated with the customer; accessing, from a memory of the data processing system, customer information data to obtain estimated working hours information for the customer; accessing, from the memory of the data processing system, information comprising a queue identifying a plurality of CSAs that are available to provide technical assistance to the customer and estimated working hours information for each of the plurality of CSAs; analyzing, via a processor, the estimated working hours information for the customer and the estimated working hours information for each of the plurality of CSAs to produce a compatibility score for each CSA, the compatibility score for a respective one of the CSAs providing an indication of how closely the working hours of the customer and of the respective one of the CSAs align; reordering, via the processor, the queue identifying the plurality of CSAs based on the compatibility scores of each of the CSAs; selecting, via the processor, a CSA from the queue to provide technical assistance to the customer; and sending, via the network connection, a second signal to the computing device of the CSA that includes an identification of the customer and the service request.

An example memory device according to the disclosure stores instructions that, when executed on a processor of a data processing system, cause the data processing system to match a customer service ambassador with a customer by receiving, via a network connection, a first signal comprising a service request for technical assistance from the customer, the service request including a customer identifier associated with the customer; accessing, from a memory of the data processing system, customer information data to obtain estimated working hours information for the customer; accessing, from the memory of the data processing system, information comprising a queue identifying a plurality of CSAs that are available to provide technical assistance to the customer and estimated working hours information for each of the plurality of CSAs; analyzing, via the processor, the estimated working hours information for the customer and the estimated working hours information for each of the plurality of CSAs to produce a compatibility score for each CSA, the compatibility score for a respective one of the CSAs providing an indication of how closely the working hours of the customer and of the respective one of the CSAs align; reordering, via the processor, the queue identifying the plurality of CSAs based on the compatibility scores of each of the CSAs; selecting, via the processor, a CSA from the queue to provide technical assistance to the customer; and sending, via the network connection, a second signal to the computing device of the CSA that includes an identification of the customer and the service request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 illustrates an example of customer activity data selected from the customer activity datastore;

FIG. 5 illustrates an example of CSA activity data selected from the CSA activity datastore;

DETAILED DESCRIPTION

Figure 1:
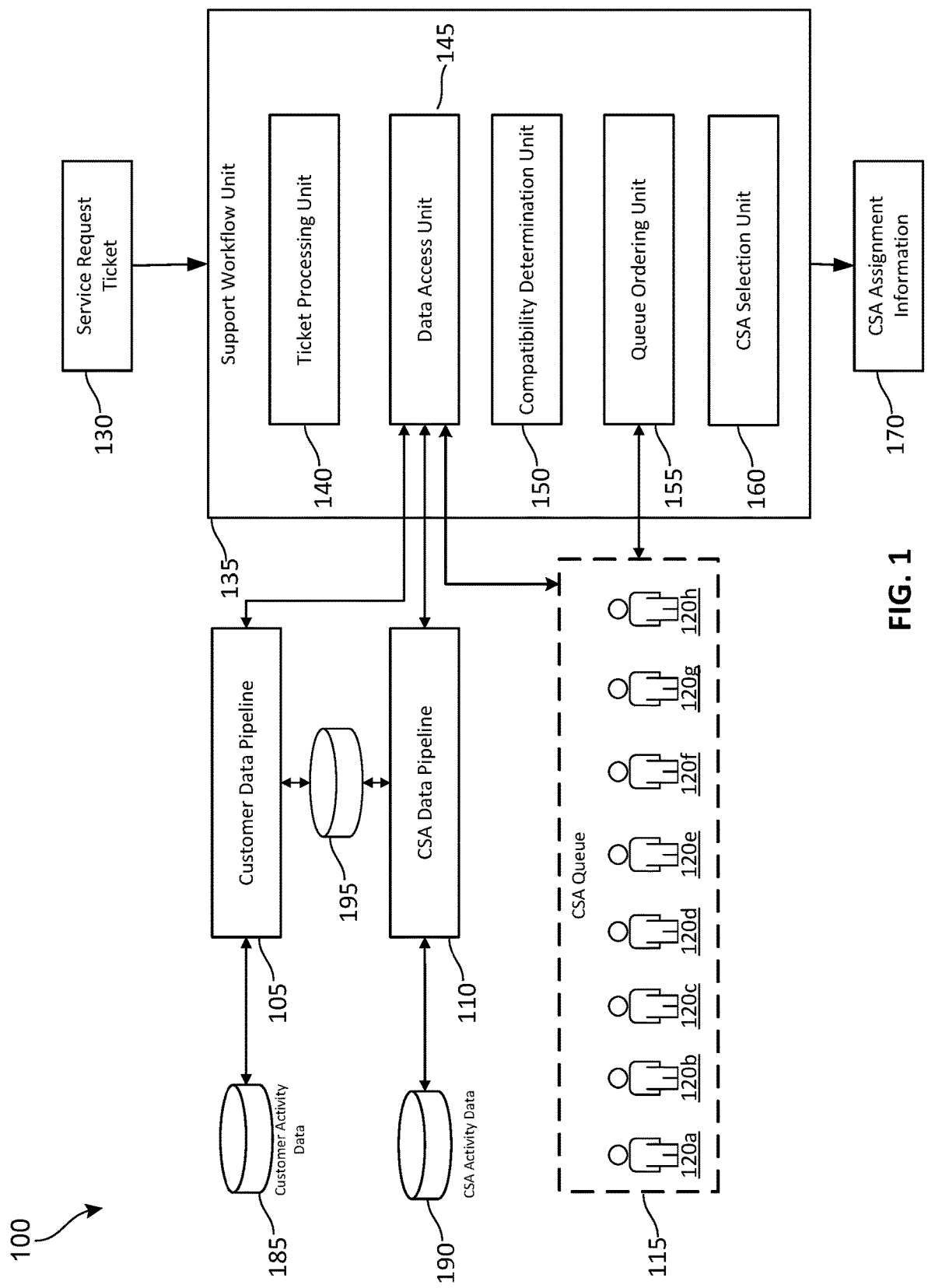
FIG. 1 is a diagram illustrating an example computing environment in which the techniques disclosed herein for matching a service request ticket with a CSA based on the working hours of the customer and the CSA.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for matching a CSA to a customer in response to receiving a service request ticket are provided. These techniques solve the technical problem of optimizing the routing of customer service requests in a customer support system to a CSA of a pool of available CSAs based on attributes of the customer and the available CSAs. Optimizing the routing is particularly difficult where the customer support system lacks information regarding the customer, the CSAs, both, and thus cannot fully optimize the matching. Conventional systems typically just match the customer support request with any available CSA from a pool of available CSAs. However, the selected CSA and the customer may have very different work schedules. The customer may work in a different geographical area located in a different time zone than the selected CSA or may work a different but slightly overlapping shift with the CSA. Conventional customer support systems may assign a customer server request ticket to a CSA who is available but whose shift is about to end. As a result, the customer service request may need to be routed to a different CSA to complete the work if the selected CSA is unable to resolve the customer service request before the end of their shift. Otherwise, the resolution of the customer service request may be delayed until the selected CSA's next shift. In either situation, the customer experience may be negatively impacted by switching CSAs or by receiving a delayed response from the selected CSA.

The techniques disclosed herein provide a further technical solution to the technical problem of matching a CSA to a customer where the CSA and customer have similar working hours. These techniques include estimating the working hours of the customer, the CSA, or both where working hours information for the customer and/or the CSA is unavailable. The techniques disclosed herein analyze customer interactions with software to determine estimated working hours for the customer. These techniques may also analyze CSA interactions with the customer support system and/or other software to determine estimated working hours for the CSA. When a service request ticket is received, the system may be configured to access information identifying a pool of available CSAs that are available to be assigned the service request ticket. A compatibility score can be determined for each of the CSAs that represents how well the CSA's estimated working hours overlap those of the customer. A higher compatibility score indicates a closer match between the estimated working hours of the CSA and the customer.

The techniques disclosed herein provide several technical benefits. Customers are automatically matched with an available CSA whose working hours are as similar as possible to those of the customer based on the compatibility score. The customer is less likely to be handed off to another CSA if the shift of the CSA with which the customer was matched ends. Thus, the customer receives better continuity of service by making it more likely that the same CSA will work on the resolution to the customer service request. Furthermore, because the working schedules of the customer and the CSA more closely align, direct communications between the customer and CSA may be made easier.

FIG. 1 illustrates an example system 100 in which the techniques disclosed herein may be implemented. The system 100 may implement a customer service system that is configured to receive a customer service request ticket 130 from a customer that is experiencing a problem for which the customer requires assistance from a CSA. The CSA may be a support engineer that is trained to provide technical support for computer software or hardware, consumer electronics products, or other products.

The system 100 may be a cloud-based system that provides a user interface through which a customer may input the service request ticket 130. The service request ticket 130 may include an identifier of the customer that has entered the ticket, such as a customer identifier (ID) number. The service request ticket 130 may include contact information for person that has entered the service request ticket 130. The customer may be a company or organization that may have multiple employees or members that may call requesting technical assistance. The service request ticket 130 may include contact information for the person that has entered the service request ticket so that a CSA that is assigned the service request ticket 130 may get in touch with the customer to provide assistance or to obtain more information regarding the problem that the customer is experiencing.

The system 100 may include a support workflow unit 135. The support workflow unit 135 may be implemented by a server or servers and may be part of a cloud-based customer support system. The support workflow unit 135 may include a ticket processing unit 140, a data access unit 145, a compatibility determination unit 150, a queue ordering unit 155, and CSA selection unit 160. The ticket processing unit 140 may be configured to receive a signal, via network connection, that includes the service request ticket 130. As discussed above, the service request ticket 130 may be entered into a web-based interface that may be transmitted from the customer's computing device over a one or more networks to the system 100. The one or more networks may be implemented by one or more public and/or private networks and may be implanted at least in part by the Internet.

The ticket processing unit 140 may be configured to receive the service request ticket 130 and to store the service request ticket in a service request database (not shown). The ticket processing unit 140 may be configured to send a signal to the compatibility determination unit 150 in response to receiving the service request ticket 130. The compatibility determination unit is configured to determine which CSA of the available CSAs has the most compatible working schedule with the working schedule of the customer. The examples which follow will describe in detail how a compatibility score may be calculated for each of the CSAs to determine which CSAs have the most compatible work schedule with the customer. The compatibility scores for the CSAs may be determined using data obtained from the customer data pipeline 105 and the CSA data pipeline 110. The functionality of these two pipelines will be discussed in the examples that follow below.

The queue ordering unit 155 may be configured to receive the compatibility score information from the compatibility determination unit 155 and to reorder the CSA queue 115. The CSA queue 115 may be implemented as a First-in/First-Out (FIFO) data structure in the memory of the system 100. The CSA queue 115 can be populated with identifiers and/or other information associated with a CSA. Information representing a CSA may be inserted into the end of the queue as that CSA becomes available to assist with an incoming service request ticket 130. Thus, CSAs that become available first will be located toward the front of the queue.

The queue ordering unit 155 may reorder the CSA queue 115, as will be discussed in the examples that follow, so that CSAs having a highest compatibility score with the customer who entered the service request ticket 130 are positioned toward the front of the queue. As discussed above, the compatibility score may be computed for each CSA based on how much overlap there is between the customer's estimated working hours and the estimated working hours of the CSA. Thus, the CSAs having a work schedule that most closely overlaps that of the customer are placed closer to the front of the queue and are more likely to be selected to assist the customer. The CSA queue 115 may be reordered for each customer service request 130 based on compatibility scores between the CSAs in the queue and the customer submitting the service request ticket 130.

The CSA selection unit 160 may be configured to select a CSA to work on the service request ticket 130 from the reordered CSA queue 115. The CSA selection unit 160 may be configured to select a first CSA available from the queue or may be configured to select a CSA from the queue that has the most number of hours of their current shift overlapping with the estimated working hours of the customer. The CSA selection unit 160 may output CSA assignment information 170 that includes an identifier of the service request ticket 130, an identifier of the customer who entered the ticket, and an identifier of the CSA assigned to the work on the service request ticket 130. The support workflow unit 135 may send a signal to the computing device of the customer that includes the CSA assignment information 170. The support workflow unit 135 may also send a signal to the computing device of the CSA selected to work on the service request ticket 130 that includes the CSA assignment information 170. The CSA assignment information 170 may also be stored in a database of the customer support system 100 (not shown) for record keeping purposes.

The customer data pipeline 105 may be configured to access customer activity datastore 185, which may be stored in a database or other persistent memory, and to analyze the customer activity data stored in the customer activity datastore 185 to determine estimated working hours for each customer. The estimated working hours for each customer may be determined using the techniques that will be discussed in detail in the examples that follow. The estimated working hours for each of the customers may be stored in the support information datastore 195. The support information datastore 195 may be stored in the same database as the customer activity datastore 185 or in a separate database. The customer data pipeline 105 may be configured to periodically query the customer activity datastore 185 and to generate the estimated working hours for the customers. For example, the customer data pipeline 105 may be configured to generate the estimated working hours for the customers daily and to store the estimated working hours in the support information datastore 195. The estimated working hours data for the customers may be generated in advance for all customers so that the estimated hours for a particular customer does not need to be calculated in response to receiving a service request ticket 130 from a customer. The customer activity data may potentially include hundreds or thousands of entries per customer per day. Periodically calculating these values and storing them in the support information datastore 195 may be more efficient than calculating the estimated working hours for each client on demand when a service request ticket 130 is received from that customer. However, the estimated working hours for a particular customer may be calculated on demand and stored in the support information datastore 195 in response to receiving a service request ticket 130 from that customer in some implementations.

The CSA data pipeline 110 may be configured to access CSA activity datastore 190, which may be stored in a database or other persistent memory, and to analyze the CSA activity data stored in the CSA activity datastore 190 to determine estimated working hours for each customer. The estimated working hours for each CSA may be determined using the techniques that will be discussed in detail in the examples that follow. The estimated working hours for each of the CSAs may be stored in the support information datastore 195. The CSA data pipeline 110 may be configured to periodically query the CSA activity datastore 190 and to generate the estimated working hours for the CSAs. For example, the CSA data pipeline 110 may be configured to generate the estimated working hours for the CSAs daily and to store the estimated working hours in the support information datastore 195. The estimated working hours data for the CSAs may be generated ahead of time for all CSAs so that the estimated hours for a particular CSA does not need to be calculated in response to receiving a service request ticket 130 from a customer.

Calculating Estimated Hours for Customers

The working hours for clients are typically not available to the CSAs. A CSA may ask the customer their typical working hours once a CSA has been assigned to a service request ticket 130, but at that point there is little that can be done if there is a significant mismatch between the working hours of the customer and the CSA. Attempting to reassign the service request ticket 130 to another CSA at that point may be even more disruptive. Consequently, the techniques disclosed herein attempt to estimate the working hours of the customer prior to matching the customer with a CSA.

The estimated working hours for customers can be determined based on their interaction with one or more software products for which user activity is logged. The software products may be cloud-based software products which generate usage logs that are accessible to the system 100 and may be stored in the customer activity datastore 185. In other implementations, the software products may be applications installed on a computing device used by the customer that may report usage information to an online entity, such as the customer activity datastore 185.

The customer data pipeline 105 may be configured to execute a query that counts the number of customer "clicks" per Coordinated Universal Time (UTC) hour over the previous day. A "click" represents a user interaction with the software that has been logged to the customer activity datastore 185. The query accesses the customer activity datastore 185 and determines the number of interactions that the customer had with the system for each hour in the last day. For example, the customer may be utilizing the Microsoft 365 Admin portal to manage applications, services, users, or other such elements associated with their enterprise, and the portal may track these interactions with the portal for auditing or other purposes. However, the techniques disclosed herein can utilize this information for the additional purpose of estimating the working hours of the customer. Furthermore, other software and/or types of software than those referred to in these examples may be tracked.

FIG. 4 illustrates an example of customer activity data 410 in which the data for customer 320A has been selected from the customer activity datastore 185. The example customer activity data 410 is intended to illustrate the concepts disclosed herein and does not limit these techniques to the specific content and format of the customer data activity 410 illustrated in this example. The example customer activity data 410 includes the customer ID associated with customer 320A, and a series of actions that were performed by customer 320A in the software for which the activity data is collected. The example data includes an identifier of the software product that was accessed, an indication of a user action that was performed by the user in the software product, and a timestamp that indicates a date and time that the action was performed. In the example illustrated in FIG. 4, the customer activity data 410 only includes user activity for a single product, but the customer activity data 410 may include activity data for multiple software products accessed by the customer. The timestamp represents a date and time that the user performed the user action. The timestamps in this example are stored in a date and time format with the time represented in UTC. The timestamps in the customer activity datastore 185 may be stored in a date and time format that represents a specific time zone. For example, the date and times may be stored according the Pacific Standard Time (PST) time zone which is offset from UTC by −8 hours. However, the customer data pipeline 105 may normalize the timestamps of all of the data to UTC so that there are no offsets associated with the activity data to make analyzing the customer activity data less complex.

Figure 3A:
FIG. 3A is a table illustrating an example of customer activity totals.
Figure 3B:
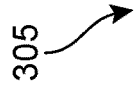
FIG. 3B is a table illustrating an example of thirty-day customer activity totals.

The output of the query may be similar to the table 300 illustrated in FIG. 3A. The table includes entries for eight customers in this example (320A, 320B, 320C, 320D, 320E, 320F, 320G). The table includes an identifier row that includes a unique identifier for each customer. For example, customer 320A is associated with customer identifier 1445691. The customer identifiers may be assigned to the customers as they enroll with a service provider for cloud-based software services. The number of clicks per hour for each of the clients has been tallied, and a total number of clicks has also been provided. While the daily usage information included in this table is indicative of the customer's working hours over a short period of time, usage data for a longer period of time may more accurately estimate the client's working hours. Accordingly, the daily usage information has been accumulated over a longer period of time, such as a number of days, weeks, or months. FIG. 3B illustrates a table 305 populated with example usage data accumulated over a 30-day period. The daily usage information may be generated by summing the daily usage information for the past 30 days. The daily usage information may be added to the accumulated usage information to generate a total accumulated usage information, such as that illustrated in table 310 of FIG. 3C. The customer data pipeline 105 may be configured to store the accumulated usage information of FIG. 3B and the total accumulated usage information of FIG. 3C in the support information datastore 195. In some implementations, the table 310 illustrated in FIG. 3C may be the same table 300 as illustrated in FIG. 3A with the totals updated to include the accumulated usage information of FIG. 3B. Two separate tables were used in this example to illustrate the concepts disclosed herein. In some implementations, the customer data pipeline 105 may maintain two tables: a first table with customer activity for the past twenty-four hours or other predetermined period of time, and a second table that includes cumulative totals for the customer activity over a longer period of time (e.g. 30 days). The support information datastore 195 may be used to determine a compatibility score with one or more of the CSAs. The computation of the compatibility scores will be discussed in detail in the examples that follow.

Figure 3C:
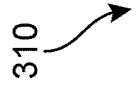
FIG. 3C is a table illustrating an example of cumulative customer activity totals based on the customer activity totals illustrated in FIGS. 3A and 3B.

The examples illustrated in FIGS. 3A-3C are intended to illustrate the concepts disclosed herein. The customer data pipeline 105 may be collate customer usage data using a different approach than illustrated in FIGS. 3A-3C to generate the usage information for each of the customers. Furthermore, the specific table layouts are intended as examples and do not limit the techniques disclosed herein to these specific table structures.

Calculating Estimated Hours for CSAs

The work schedules for the CSAs may not be available to the customer support system 100. The work schedules information may be maintained in a payroll or scheduling system that is separate from the customer support system 100 for privacy reasons due to the sensitive nature of this information. However, the customer support system 100 may be configured to estimate the working hours of the CSAs through their interactions with the customer support system 100 and other software related to their customer support role.

The CSA activities datastore 190 may store the activity information that may be used to estimate the working hours for the CSA. For example, entries in the CSA activities datastore 190 may reflect various activities undertaken by the CSA, such as but not limited to logging into the system 100, participating in a call with a customer, participating in meeting (internal or with a customer), researching service issue related to a service request ticket 130, etc. Activity entries associated with the CSA being offline may be excluded from the counts, such as logging out or signing out, at lunch, on break, and out of office. The CSA data pipeline 110 may be configured to execute a query that counts the number of CSA activities per Coordinated Universal Time (UTC) hour over the previous day. The output of the query may be a table similar that illustrated in FIG. 2, which includes a unique identifier associated with each CSA, an email address for the CSA, a total number of actions per day, and an hour-by-hour breakdown of the activities. In some implementations, the unique identifier may be the email address or other alias for the CSA, and there may not be separate entries for the unique identifier and the email address for the CSA. Furthermore, the specific information that is returned by the query is intended to illustrate the concepts disclosed herein and does not limit the techniques disclosed herein to these specific example implementations.

FIG. 5 illustrates an example of CSA activity data 510 in which the data for CSA 120A has been selected from the CSA activity datastore 190. The example CSA activity data 510 is intended to illustrate the concepts disclosed herein and does not limit these techniques to the specific content and format of the CSA data activity 510 illustrated in this example.

The example CSA activity data 510 includes the customer ID associated with the CSA 120A, and a series of actions that were performed by CSA 120A logged into customer service activity data that captures information that may be used to determine the actions that were taken by particular CSA. The example data includes an identifier of the software product for which the CSA performed an action, an indication of an action that was performed by the CSA to assist with a technical problem associated with software product, and a timestamp that indicates a date and time that the action was performed. In the example illustrated in FIG. 5, the customer activity data 510 only includes user activity associated with a single software product, but the CSA activity data 510 may include activity data for multiple software products accessed by the CSA while working on service request tickets 130. The timestamp represents a date and time that the CSA performed the CSA action. Like the customer access data 410 in the preceding example, the timestamps in this example are stored in a date and time format with the time represented in UTC. The timestamps in the CSA activity datastore 190 may be stored in a date and time format that represents a specific time zone. However, the CSA data pipeline 110 may normalize the timestamps of all of the data to UTC so that there are no offsets associated with the activity data to make analyzing the CSA activity data less complex.

The CSA information represents a cumulative set of data for a predetermined period of time, such as a 30-day period. Using a longer period of time may provide a more accurate estimation of the working hours of each of the CSAs. However, there is a risk that a CSA could change shifts over time and the data may indicate that they are working hours that they no longer work. The queries performed by the CSA data pipeline 110 may disregard CSA hours for a respective one of the CSAs if there are not at least a threshold number of actions for that respective CSA. The predetermined threshold may be an ad-hoc number that may be configurable by an administrator of the system 100. The predetermined threshold represents a minimum number of activities recorded for a CSA for which ambassador hours are reasonably captured. The CSA data pipeline 110 may be configured to store the CSA activity information of FIG. 2 in the support information datastore 195. The support information datastore 195 may be used to determine a compatibility score between the CPAs and a respective one of the plurality of customers. The computation of the compatibility scores will be discussed in detail in the examples that follow.

Calculating Compatibility Scores

The compatibility determination unit 150 of the support workflow unit 135 may be configured to compute a Shift Compatibility Index (SCI) for each CSA that provides an indication of how compatible a particular CSA is with a particular customer based on the how much of an overlap there is between estimated working hours of the CSA and the estimated working hours of the customer. The SCI formula produces a zero value where the estimated working hours of the CSA are a complete mismatch for the estimated working hours of the customer. For example, referring to FIG. 3C, customer 320F has estimated working hours of 05:00-8:00 UTC, and referring to FIG. 2, CSA 120C has estimated working hours of 16:00-23:00 UTC. The SCI formula would return a zero value for the client 320F and the client 120C because their estimated working hours have no overlap. In contrast, if the estimated working hours of the customer and the CSA align completely, the SCI formula would return a value of '100' indicating that the estimated working schedules of the customer and the CSA align completely. For example, referring to FIG. 3C, customer 320A has estimated working hours of 05:00-13:00 UTC, and referring to FIG. 2, CSA 120A also has estimated working hour of 05:00-13:00 UTC. The working hours of the customer 320A and the CSA 120A completely align.

Figure 2:
FIG. 2 is a table illustrating an example of CSA activity totals.

An example SCI formula according to the techniques disclosed herein is based on values $x_i$ which represents a count of the CSA activities and the customer activities illustrated in FIGS. 2 and 3C respectively and stored in the support information datastore 195. An example SCI formula is:

$$SCI = 200 \sum_{i=0}^{23} \frac{x_i y_i}{x_i + y_i}$$

where $$x_i = \frac{X_i}{\sum_{k=0}^{23} X_k} \text{ and } y_i = \frac{Y_i}{\sum_{k=0}^{23} Y_k}$$

are the normalized activities, such that their sum over the 24 hours of the day are equal to 1. When estimated working hours of the CSA and the customer are totally disjointed with no overlapping hours, the product $x_i \cdot y_i$ is always null, and the SCI=0. When estimated working hours of the CSA and the customer follow the same profile, $x_i = y_i$ for all i, the sum becomes $$SCI = 200 \sum_{i=0}^{23} \frac{x_i}{2} = 100.$$

The SCI can be computed for each of the CSAs in the CSA queue 115 and the order of the CSAs in the CSA queue 115 can be reordered according to the SCI. An example of such reordering follows in the next section.

Reordering the CSA Queue Based on Compatibility Scores

The queue ordering unit 155 of the support workflow unit 135 may reorder to the CSA queue 115 according to the compatibility scores determined for each of the CSAs and the customer requesting technical assistance in the service request ticket 130. The CSA selection unit 160 may be configured to select a CSA to assist the customer in resolving the technical problem referenced in the service request ticket 130. The CSA queue 115 may initially be ordered based on when the CSA became available to assist a customer.

Figure 7:
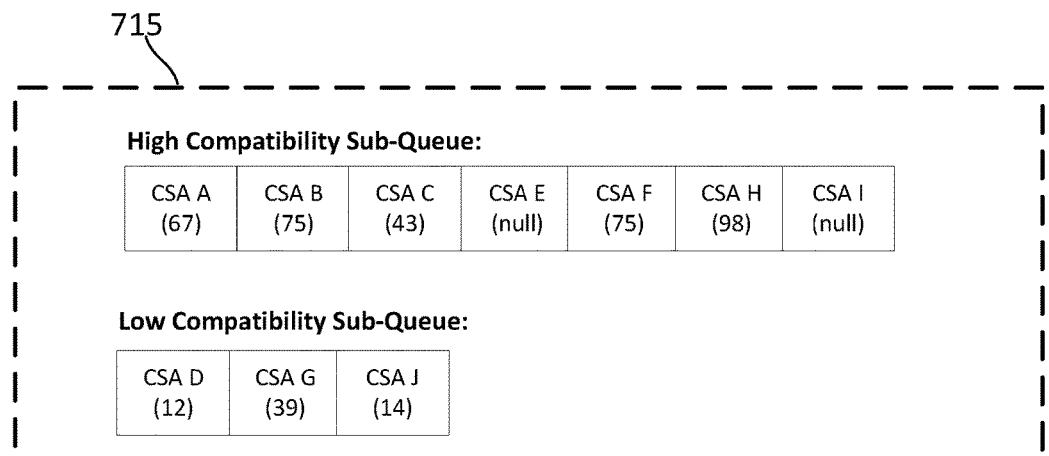
FIG. 7 is a diagram that illustrates an example reordering of a CSA queue.

FIG. 7 illustrates an example of CSA queue being reordered. The CSA queue illustrated in FIG. 7 may be similar to the CSA queue 115 discussed in the preceding examples. FIG. 7 illustrates an example of the CSA queue in which ten CSAs are currently available to assist a customer. FIG. 7 illustrates four states of the queue as the reordering process is applied to reorder the queue according to the compatibility scores between each of the CSAs in the queue and the customer associated with the service request ticket 130 to be assigned to a CSA in the queue. The CSA queue is in an initial state 705 at the time that service request ticket 130 is received. The CSA queue in the initial state 705 is ordered by how long each of the CSAs has waited to be assigned to a customer. CSA A is at the front of the queue, indicating that CSA A has waited the longest to be assigned to a customer, while CSA J is at the end of the queue, indicating the CSA J has waited the least amount of time to be assigned to a customer. As an additional CSA becomes available, that CSA would be added to the end of the queue after CSA J. The "null" values associated with each of the CSAs in the CSA queue indicates that no compatibility score has been calculated for the CSAs at this stage, typically due to a lack of data.

Compatibility scores are then calculated for each of the CSAs in the queue. A second state 710 of the CSA queue is illustrated in FIG. 7 in which the compatibility scores have been added to each of the CSA entries in the queue. The compatibility scores may be determined using the techniques illustrated in the preceding examples. A null value for the compatibility score of a particular CSA indicates that there was insufficient data to calculate the compatibility score for that CSA. In some implementations, if the CSA activity data has less than a predetermined total number of activity entries for the period in which the compatibility score is being calculated, the compatibility score calculation mechanisms may return a null value. For example, the predetermined threshold number of entries may be set to 100 over a 30-day period in some implementations. The predetermined threshold total number of activity entries may be configurable by an administrator of the system 100 to permit the compatibility score calculations to be fine-tuned. Too few activity entries may provide an incomplete or inaccurate picture of the actual working hours of the CSA. Furthermore, the compatibility score calculation mechanism is not intended to punish new CSAs, CSAs who have returned from a vacation or leave, or managers who seldom take on customer service requests 130 and as such do not have sufficient data in the CSA activity data to estimate their working hours. Thus, the queue ordering unit 155 may leave CSAs having a null compatibility score in their original place in the CSA queue.

In stage 715, the CSA queue is split into two sub-queues. The first sub-queue is a high-compatibility sub-queue which includes the CSAs having a compatibility score higher than a predetermined threshold compatibility score, and the second sub-queue is a low-compatibility sub-queue which includes CSAs having a compatibility score that does not exceed the threshold. In the example illustrated in FIG. 7, the compatibility scores may range from 0 (no match) to 100 (perfect match). The threshold compatibility score in this example is 40. The CSAs having a null value included in the high compatibility sub-queue. The relative ordering of the CSAs in the high compatibility sub-queue and the low compatibility sub-queue is maintained from state 710. In this example, the relative ordering was based on how long each of the CSAs has been waiting to be assigned to a customer. In state 715, only three of the CSAs had a compatibility score than did not exceed the threshold compatibility score of 40 used in this example and were added to the low compatibility sub-queue. The threshold score is ideally selected to optimize the compatibility between the CSA and the customer without penalizing CSAs who do not have a complete overlap between their estimated working hours and the estimated working hours of the customer.

The reordered CSA queue may then be created by appending the low compatibility sub-queue to the end of the high compatibility sub-queue. State 720 of the CSA queue illustrate an example of the reordered queue in which the low compatibility sub-queue to the end of the high compatibility sub-queue of state 715. The reordered CSA queue may be used to select a CSA to assign to the CSA selection unit 160.

Figure 6:
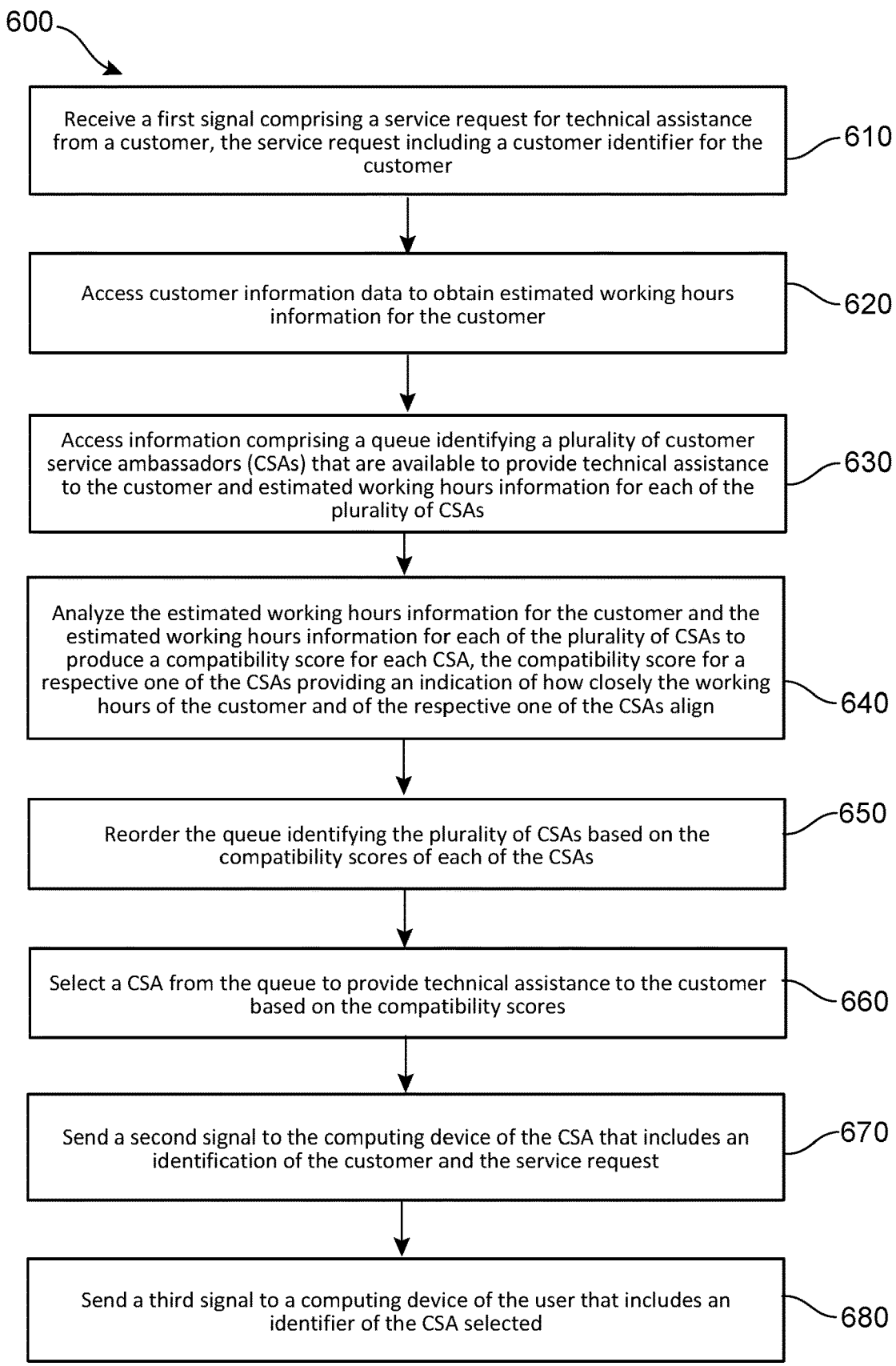
FIG. 6 is a flow chart illustrating an example process executed by a data processing system for matching a service request ticket with a CSA based on the working hours of the customer and the CSA.

FIG. 6 is a flow chart illustrating an implementation of an example process 600 executed by a data processing system for matching a customer service ambassador with a customer for handling a service request ticket created by the customer. The process 600 may be implemented by the support workflow unit 135 of the system 100.

The process 600 may include an operation 610 of receiving, via a network connection, a first signal comprising a service request for technical assistance from a customer, the service request including a customer identifier associated with the customer. A service request ticket 130 may be created by a customer to report a technical issue for which the customer is seeking assistance. The service request ticket 130 may include a customer ID of the customer, contact information such as a phone number and/or an email address of the customer, product information identifying a product for which the customer is seeking assistance, and a description of the problem that the customer is experiencing. The service request ticket 130 may be created using a user interface provide by the ticket processing unit 140 of the support workflow unit 135. The user interface may comprise a webpage, fillable form, or other content that may be remotely accessed over a network (such as the Internet) from the customer's computing device. Such a user interface may be accessible via a web-browser or similar application on the computing device. The service request ticket 130 may be generated from an application installed on the computing device of the customer. The application may be configured to generate a user interface for providing information that may be used to generate the service request ticket 130. The user interface may include fillable fields, drop down lists, text boxes, and/or other user interface elements that allow the customer to enter the details of the service request ticket 130. The user interface may provide a button or other user interface element that may be activated by the customer to cause the customer's computing device to send the service request ticket 130 over a network connection to the support workflow unit 135 of the system 100.

The process 600 may include an operation 620 of accessing customer information data to obtain estimated working hours information for the customer in response to receiving the service request ticket 130. As discussed in the preceding examples, the estimated working hours data for the customers can be generated by the customer data pipeline 105 and stored in the support information datastore 195. The customer data pipeline 130 may periodically update the estimated working hours data as new customer activity data is recorded in the customer activity datastore 185. The data access unit 145 of the support workflow unit 135 may submit a query to the support information datastore 195 to retrieve the estimated working hours information for the customer. The estimated working hours information may comprise information similar to that illustrated in the table of FIG. 3C, in which an activity count for each of 24 hours of the day (represented as hour 0 to hour 23 in the table) is included. A non-zero activity count indicates that the customer was working for at least part of that hour during the period over which the estimated working hours data was collected. The estimated working hours information may represent cumulative data from the past, week, month, quarter, or other period of time over which the customer data was analyzed to generate the estimated working hours data.

The process 600 may include an operation 630 of accessing information comprising a queue identifying a plurality of customer service ambassadors (CSAs) that are available to provide technical assistance to the customer and estimated working hours information for each of the plurality of CSAs. The data access unit 145 can access the contents of the CSA queue 115 to determine which CSAs are available to provide technical assistance to the customer. The CSA data pipeline 110 can provide the estimated working hours for each of the plurality of CSAs to the data access unit 145. As discussed in the preceding examples, the estimated working hours data for the CSAs may be generated by the CSA data pipeline 110 and stored in the support information datastore 195. The CSA data pipeline 110 may periodically update the estimated working hours data as new CSA data is recorded in the CSA activity datastore 190.

The data access unit 145 may first determine which CSAs are currently working by accessing the CSA queue 115, which includes information for each of the CSAs that are currently available to work on the service request ticket 130 received in stage 610. The data access unit 145 may use the CSA identifiers obtained from the CSA queue 115 to query the CSA activity datastore 190 to obtain the estimated working hours information for the available CSAs. The estimated working hours information may comprise information similar to that illustrated in the table of FIG. 2, in which an activity count for each of 24 hours of the day (represented as hour 0 to hour 23 in the table) is included. A non-zero activity count indicates that the CSA was working for at least part of that hour during the period over which the estimated working hours data was collected. The estimated working hours information may represent cumulative data from the past, week, month, quarter, or other period of time over which the CSA data was analyzed to generate the estimated working hours data.

The process 600 may include an operation 640 of analyzing the estimated working hours information for the customer and the estimated working hours information for each of the plurality of CSAs to produce a compatibility score for each CSA, where the compatibility score for a respective one of the CSAs providing an indication of how closely the working hours of the customer and of the respective one of the CSAs align. The compatibility scores may be calculated using the techniques disclosed in the preceding examples.

The process 600 may include an operation 650 of reordering the queue identifying the plurality of CSAs based on the compatibility scores of each of the CSAs. The order of the CSAs in the CSA queue 115 may be reordered by the queue ordering unit 155 based on the compatibility scores calculated in stage 640. The CSA queue 115 may initially be ordered based on the amount of time that each of the CSAs has been available to accept a service request ticket 130. Thus, a CSA who becomes available first would be placed toward the front of the queue. The CSA queue 115 may be reordered based on the compatibility scores as illustrated in the preceding examples. The CSAs having a higher compatibility score may be placed at the beginning of the CSA queue 115.

The process 600 may include an operation 660 of selecting a CSA from the CSA queue 115 to provide technical assistance to the customer. In some implementations, the CSA selection unit 160 may select the first CSA from the reordered CSA queue to assist the customer with the service request ticket 130. In other implementations, the CSA selection unit 160 may select the CSA having the highest compatibility score.

The process 600 may include an operation 680 of sending, via the network connection, a second signal to the computing device of the CSA that includes an identification of the customer and the service request. The CSA selection unit 160 may send a message to the CSA indicating that the service request ticket 130 has been assigned to the CSA. The message may include includes service ticket identifier assigned to the service request ticket 130 by the ticket processing unit 140, the customer ID of the customer, contact information for the customer, the product for which technical assistance has been requested, details of the technical issue being experienced by the customer, and/or other information that may assist the CSA in diagnosing and correcting the technical issue being experienced by the customer. The CSA may contact the customer via email, by telephone, by online chat, or other means in response to being assigned the service request ticket 130. In some implementations, the operation 670 may be omitted, and the CSA receiving the message from the CSA selection unit 160 may instead contact the customer responsive to receiving the message.

The process 600 may include an optional operation 680 of sending, via the network connection, a third signal to a computing device of the user that includes an identifier of the CSA selected. In some implementations, the operation 680 may be omitted, and the CSA receiving the message from the CSA selection unit 160 in operation 670 may instead contact the customer responsive to receiving the message. In implementations where the third signal is sent, the CSA selection unit 160 of the support workflow unit 135 may send a signal to the computing device of the customer that includes a message indicating that that a CSA has been assigned to the service request ticket 130. The message may include contact information for the CSA, an expected response time by which the customer may expect to be contacted by the CSA and/or provided with a response to their technical issue, and/or other information regarding the status of the service request ticket 130. The message may include a service request ticket identifier of the service request ticket 130, which may have been provided to the customer following stage 610 in which the service request ticket 130 was created.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
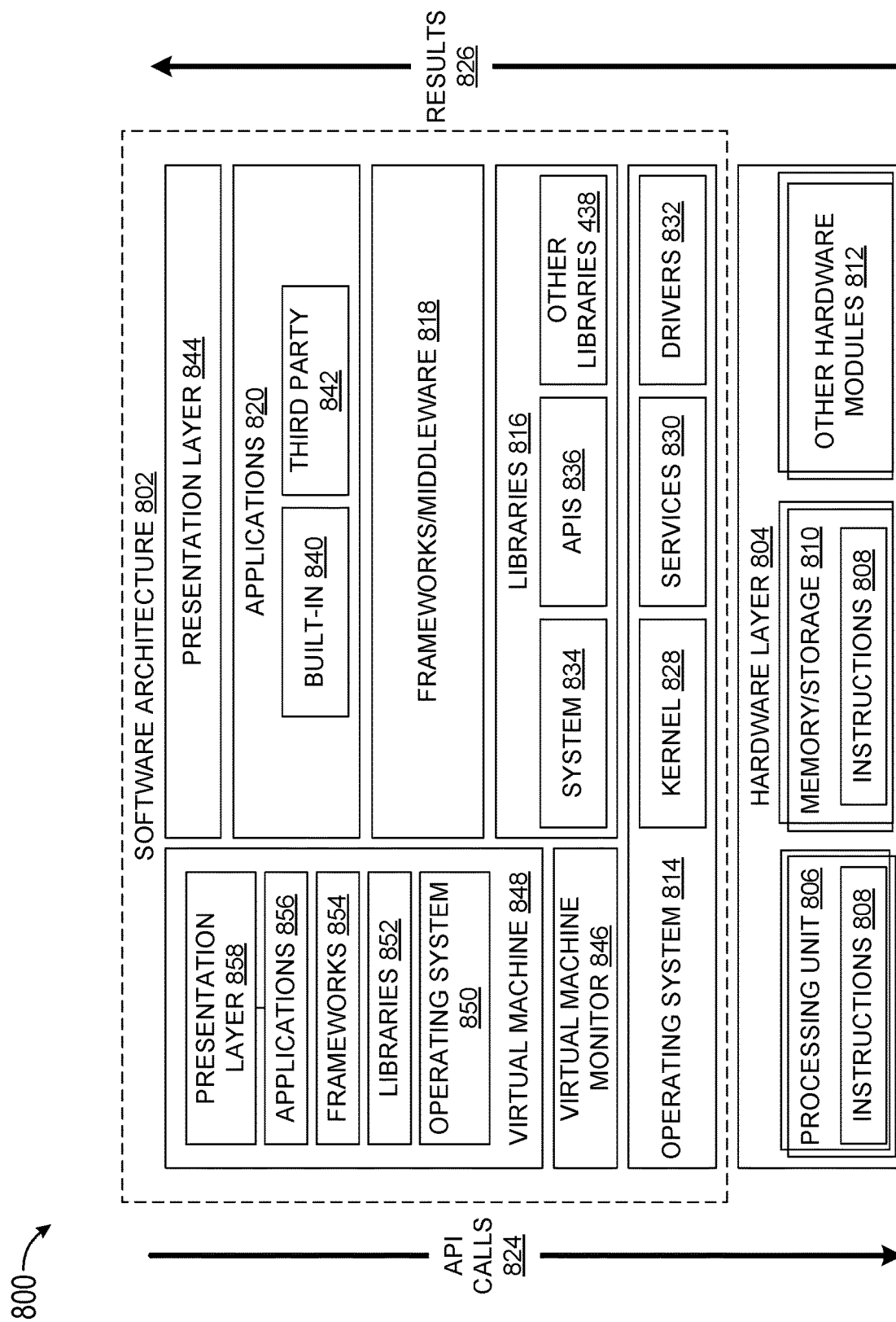
FIG. 8 is a block diagram illustrating an example software architecture, various portions of which may be used in conjunction with various hardware architectures herein described, which may implement any of the features herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 808 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 814, libraries 872, frameworks 854, applications 856, and/or a presentation layer 858.

Figure 9:
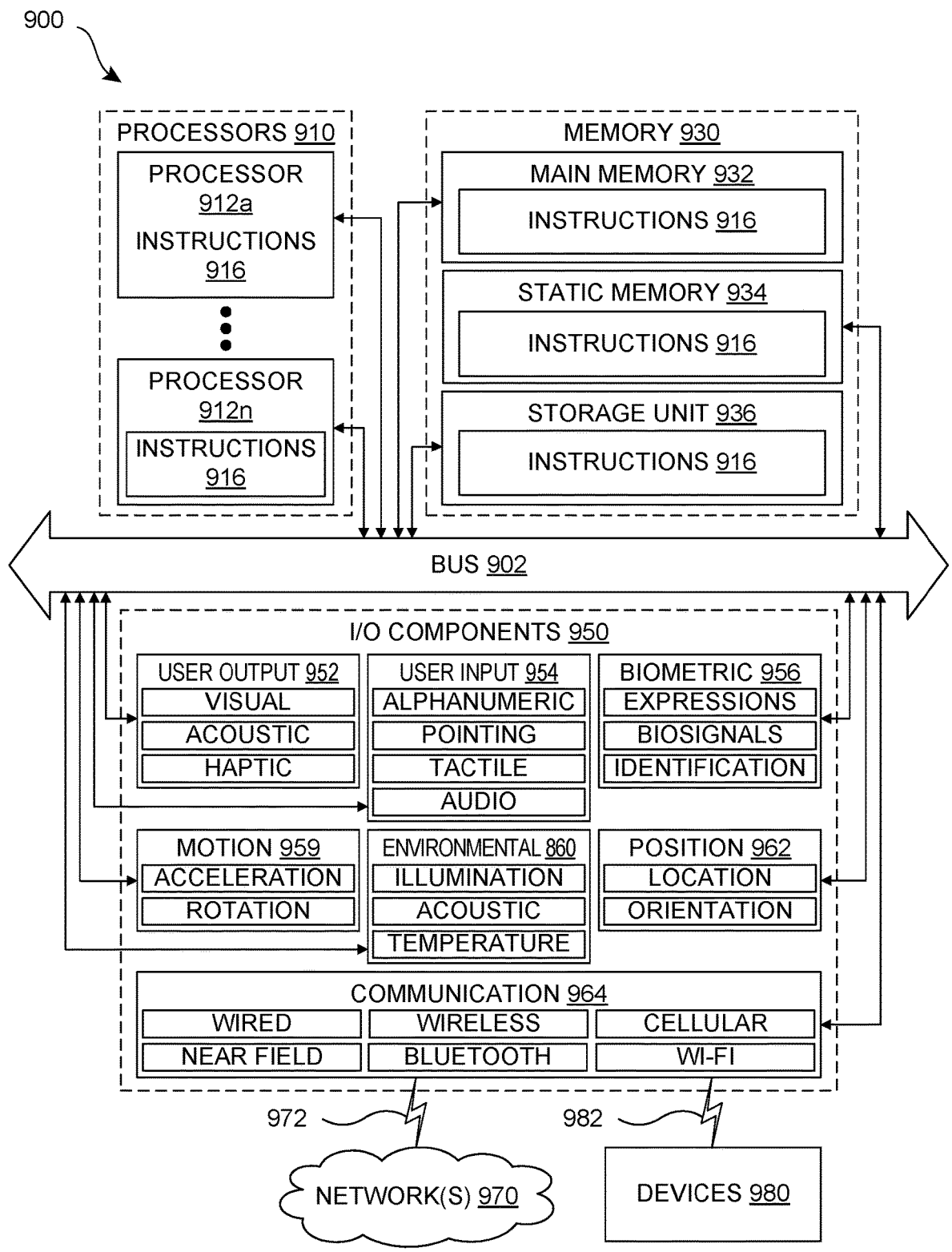
FIG. 9 is a block diagram illustrating components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912$a$ to 912$n$ that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

In the following, further features, characteristics and advantages of the system and method will be described by means of items:

Item 1. A data processing system comprising: a processor; and a computer-readable medium storing executable instructions for causing the processor to perform operations comprising: receiving, via a network connection, a first signal comprising a service request for technical assistance from a customer, the service request including a customer identifier associated with the customer; accessing, from a memory of the data processing system, customer information data to obtain estimated working hours information for the customer; accessing, from the memory of the data processing system, information comprising a queue identifying a plurality of customer service ambassadors (CSAs) that are available to provide technical assistance to the customer and estimated working hours information for each of the plurality of CSAs; analyzing the estimated working hours information for the customer and the estimated working hours information for each of the plurality of CSAs to produce a compatibility score for each CSA, the compatibility score for a respective one of the CSAs providing an indication of how closely the working hours of the customer and of the respective one of the CSAs align; reordering the queue identifying the plurality of CSAs based on the compatibility scores of each of the CSAs; selecting a CSA from the queue to provide technical assistance to the customer; and sending, via the network connection, a second signal to the computing device of the CSA that includes an identification of the customer and the service request.

Item 2. The data processing system of item 1, wherein, to analyze the estimated working hours information for the customer and the estimated working hours information for each of the plurality of CSAs to produce a compatibility score for each CSA, the executable instructions further comprise instructions configured to cause the processor to perform operations including: determining a compatibility score for a respective one of the plurality of CSAs by comparing the estimated working hours for the CSA with the estimated working hours for the client.

Item 3. The method of item 2, wherein to determine the compatibility score for a respective one of the CSAs, the executable instructions further comprise instruction configured to cause the processor to perform operations including: determining the compatibility score as $$SCI = 200 \sum_{i=0}^{23} \frac{x_i y_i}{x_i + y_i},$$

wherein the SCI represents the compatibility score, $x_i$ represents a number of documented CSA activities for a particular hour of a day, and $y_i$ represents a number of documented customer activities for a particular hour of the day, and $x_i$ and $y_i$ are normalized such that the sums of $x_i$ are equal to 1 and the sum of $y_i$ are each equal to 1.

Item 4. The data processing system of item 1, wherein, to reorder the queue identifying the plurality of CSAs based on the compatibility scores of each of the CSAs, the executable instructions further comprise instructions configured to cause the processor to perform operations including: splitting the queue into a high compatibility queue and a low compatibility queue; and placing CSAs from the queue into the high compatibility queue responsive to a compatibility score associated with each the respective CSAs being at least a predetermined threshold compatibility score.

Item 5. The data processing system of item 4, further comprising instructions configured to cause the processor to perform operations comprising: placing CSAs from the queue into the low compatibility queue responsive to a compatibility score associated with each the respective CSAs being less than the predetermined threshold compatibility score.

Item 6. The data processing system of item 5, wherein, to reorder the queue of available CSAs, the executable instructions further comprise instructions configured to cause the processor to perform operations including: placing CSAs having a score indicative of a new CSA into the high priority queue.

Item 7. The data processing system of item 4, wherein, to select the CSA to provide technical assistance to the customer, the executable instructions further comprise instructions configured to cause the processor to perform operations including: appending the low priority queue on the end of the high priority queue to produce a reordered queue; and selecting the CSA from the reordered queue.

Item 8. The data processing system of item 1, wherein, to access the customer information data to obtain the estimated working hours information for the customer, the executable instructions further comprise instructions configured to cause the processor to perform operations including: selecting task records associated with the customer from the customer information data, the task records indicating an action taken by the customer, a time at which the action was taken, and an identifier of the customer that performed the action; and analyzing the task records to determine how many actions were taken by the customer for each hour.

Item 9. The data processing system of item 1, wherein, to access the estimated working hours information for the CSAs, the executable instructions further comprise instructions configured to cause the processor to perform operations including: selecting task records from a CSA information data store, the task records indicating an action taken by a CSA, a time at which the action was taken, and an identifier of the CSA that performed the action; and analyzing the task records to determine how many actions were taken by each CSA for each hour.

Item 10. A method performed by a data processing system for matching a customer service ambassador (CSA) with a customer, the method comprising: receiving, via a network connection, a first signal comprising a service request for technical assistance from the customer, the service request including a customer identifier associated with the customer; accessing, from a memory of the data processing system, customer information data to obtain estimated working hours information for the customer; accessing, from the memory of the data processing system, information comprising a queue identifying a plurality of CSAs that are available to provide technical assistance to the customer and estimated working hours information for each of the plurality of CSAs; analyzing, via a processor, the estimated working hours information for the customer and the estimated working hours information for each of the plurality of CSAs to produce a compatibility score for each CSA, the compatibility score for a respective one of the CSAs providing an indication of how closely the working hours of the customer and of the respective one of the CSAs align; reordering, via the processor, the queue identifying the plurality of CSAs based on the compatibility scores of each of the CSAs; selecting, via the processor, a CSA from the queue to provide technical assistance to the customer; and sending, via the network connection, a second signal to the computing device of the CSA that includes an identification of the customer and the service request.

Item 11. The method of item 10, wherein analyzing the estimated working hours information for the customer and the estimated working hours information for each of the plurality of CSAs to produce a compatibility score for each CSA further comprises: determining a compatibility score for a respective one of the plurality of CSAs by comparing the estimated working hours for the CSA with the estimated working hours for the client.

Item 12. The method of item 11, wherein calculating the compatibility score for a respective one of the CSAs includes instructions further comprises:
determining the compatibility score as $$SCI = 200 \sum_{i=0}^{23} \frac{x_i y_i}{x_i + y_i},$$

wherein the SCI represents the compatibility score, $x_i$ represents a number of documented CSA activities for a particular hour of a day, and $y_i$ represents a number of documented customer activities for a particular hour of the day, and $x_i$ and $y_i$ are normalized such that the sums of $x_i$ are equal to 1 and the sum of $y_i$ are each equal to 1.

Item 13. The method of item 10, wherein reordering the queue of available CSAs further comprises: splitting the queue into a high compatibility queue and a low compatibility queue; placing CSAs from the first queue into the high compatibility queue responsive to a compatibility score associated with each the respective CSAs being at least a predetermined threshold compatibility score; placing CSAs from the first queue into the low compatibility queue responsive to a compatibility score associated with each the respective CSAs being less than the predetermined threshold compatibility score; appending the low priority queue on the end of the high priority queue to produce a reordered queue; and selecting the CSA from the reordered queue.

Item 14. The method of item 10, wherein accessing the customer information data to obtain the estimated working hours information for the customer further comprises: selecting task records associated with the customer from the customer information data, the task records indicating an action taken by the customer, a time at which the action was taken, and an identifier of the customer that performed the action; and analyzing the task records to determine how many actions were taken by the customer for each hour.

Item 15. The method of item 10, wherein accessing the estimated working hours information for the CSAs further comprises: selecting task records from a CSA information data store, the task records indicating an action taken by a CSA, a time at which the action was taken, and an identifier of the CSA that performed the action; and analyzing the task records to determine how many actions were taken by each CSA for each hour.

Item 16. A memory device storing instructions that, when executed on a processor of a data processing system, cause the data processing system to match a customer service ambassador (CSA) with a customer, by: receiving, via a network connection, a first signal comprising a service request for technical assistance from the customer, the service request including a customer identifier associated with the customer; accessing, from a memory of the data processing system, customer information data to obtain estimated working hours information for the customer; accessing, from the memory of the data processing system, information comprising a queue identifying a plurality of CSAs that are available to provide technical assistance to the customer and estimated working hours information for each of the plurality of CSAs; analyzing, via the processor, the estimated working hours information for the customer and the estimated working hours information for each of the plurality of CSAs to produce a compatibility score for each CSA, the compatibility score for a respective one of the CSAs providing an indication of how closely the working hours of the customer and of the respective one of the CSAs align; reordering, via the processor, the queue identifying the plurality of CSAs based on the compatibility scores of each of the CSAs; selecting, via the processor, a CSA from the queue to provide technical assistance to the customer; and sending, via the network connection, a second signal to the computing device of the CSA that includes an identification of the customer and the service request.

Item 17. The memory device of item 16, wherein, to analyze the estimated working hours information for the customer and the estimated working hours information for each of the plurality of CSAs to produce a compatibility score for each CSA, the executable instructions further comprises instructions configured to cause the processor to perform operations including: determining a compatibility score for a respective one of the plurality of CSAs by comparing the estimated working hours for the CSA with the estimated working hours for the client.

Item 18. The memory device of item 17, wherein calculating the compatibility score for a respective one of the CSAs includes instructions configured to cause the processor to perform operations including:
determining the compatibility score as $$SCI = 200 \sum_{i=0}^{23} \frac{x_i y_i}{x_i + y_i},$$

wherein the SCI represents the compatibility score, $x_i$ represents a number of documented CSA activities for a particular hour of a day, and $y_i$ represents a number of documented customer activities for a particular hour of the day, and $x_i$ and $y_i$ are normalized such that the sums of $x_i$ are equal to 1 and the sum of $y_i$ are each equal to 1.

Item 19. The memory device of item 17, wherein, to reorder the queue of available CSAs, the executable instructions further comprise instructions configured to cause the processor to perform operations including: splitting the queue into a high compatibility queue and a low compatibility queue; placing CSAs from the first queue into the high compatibility queue responsive to a compatibility score associated with each the respective CSAs being at least a predetermined threshold compatibility score; placing CSAs from the first queue into the low compatibility queue responsive to a compatibility score associated with each the respective CSAs being less than the predetermined threshold compatibility score; appending the low priority queue on the end of the high priority queue to produce a reordered queue; and selecting the CSA from the reordered queue.

Item 20. The memory device of item 16, wherein, to access the customer information data to obtain the estimated working hours information for the customer, the executable instructions further comprise instructions configured to cause the processor to perform operations including: selecting task records associated with the customer from the customer information data, the task records indicating an action taken by the customer, a time at which the action was taken, and an identifier of the customer that performed the action; and analyzing the task records to determine how many actions were taken by the customer for each hour.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a computer-readable medium storing executable instructions for causing the processor to perform operations comprising:
receiving, via a network connection, a first signal comprising a service request for technical assistance from a customer, the service request including a customer identifier associated with the customer;
operating a customer data pipeline to determine estimated working hours information for the customer by configuring the customer data pipeline with the processor to perform:
querying usage logs for a plurality of software products to which the customer has access, the usage logs including timestamps indicating when a plurality of users licensed to access the plurality of software products performed one or more actions using the plurality of software products;
normalizing the timestamps in the usage logs relative to a first time zone to generate normalized usage data; and
analyzing the normalized usage data to generate and provide to the processor the estimated working hours of the customer relative to the first time zone based on the normalized usage data;
operating a customer service ambassadors (CSAs) pipeline to produce estimated working hours for a plurality of CSAs by analyzing task records from a CSA information datastore, each task record including an identifier of the CSA that performed a task and timestamp indicating when the CSA performed the task, including normalizing the timestamp associated with each of the task record relative to the first time zone;
accessing, from a memory of the data processing system, information comprising a queue identifying a subset of the plurality of CSAs that are currently available to provide technical assistance to the customer and identifying estimated working hours information for each of the plurality of CSAs based on output of the CSA pipeline;
analyzing the estimated working hours for the customer and the estimated working hours information for each of the plurality of CSAs to produce a compatibility score for each CSA, the compatibility score for a respective one of the CSAs providing an indication of how closely the working hours of the customer and of the respective one of the plurality of CSAs align;
reordering the queue identifying the plurality of CSAs based on the compatibility scores of each of the CSAs;
selecting a CSA from the queue to provide technical assistance to the customer; and
sending, via the network connection, a second signal to a computing device of the CSA that includes an identification of the customer and the service request.

2. The data processing system of claim 1, wherein, to analyze the estimated working hours information for the customer and the estimated working hours information for each of the plurality of CSAs to produce a compatibility score for each CSA, the executable instructions further comprise instructions configured to cause the processor to perform operations including:
determining a compatibility score for a respective one of the subset of the plurality of CSAs by comparing the estimated working hours for the CSA with the estimated working hours for the customer.

3. The data processing system of claim 2, wherein to determine the compatibility score for a respective one of the CSAs, the executable instructions further comprise instruction configured to cause the processor to perform operations including:
determining the compatibility score as $$SCI = 200 \sum_{i=0}^{23} \frac{x_i y_i}{x_i + y_i},$$

wherein SCI represents the compatibility score, $x_i$ represents a number of documented CSA activities for a particular hour of a day, and $y_i$ represents a number of documented customer activities for a particular hour of the day, and $x_i$ and $y_i$ are normalized such that sums of $x_i$ are equal to 1 and sums of $y_i$ are each equal to 1.

4. The data processing system of claim 1, wherein, to reorder the queue identifying the subset of the plurality of CSAs based on the compatibility scores of each of the CSAs, the executable instructions further comprise instructions configured to cause the processor to perform operations including:
splitting the queue into a high compatibility queue and a low compatibility queue; and
placing CSAs from the queue into the high compatibility queue responsive to a compatibility score associated with each of the respective CSAs being at least a predetermined threshold compatibility score.

5. The data processing system of claim 4, further comprising instructions configured to cause the processor to perform operations comprising:
placing CSAs from the queue into the low compatibility queue responsive to a compatibility score associated with each of the respective CSAs being less than the predetermined threshold compatibility score.

6. The data processing system of claim 5, wherein, to reorder the queue of available CSAs, the executable instructions further comprise instructions configured to cause the processor to perform operations including:
placing CSAs having a score indicative of a new CSA into the high compatibility queue.

7. The data processing system of claim 4, wherein, to select the CSA to provide technical assistance to the customer, the executable instructions further comprise instructions configured to cause the processor to perform operations including:
appending the low compatibility queue on an end of the high compatibility queue to produce a reordered queue; and
selecting the CSA from the reordered queue.

8. The data processing system of claim 1, wherein, to access the estimated working hours information for the CSAs, the executable instructions further comprise instructions configured to cause the processor to perform operations including:
selecting task records from a CSA information data store, the task records indicating an action taken by a CSA, a time at which the action was taken, and an identifier of the CSA that performed the action; and
analyzing the task records to determine how many actions were taken by each CSA for each hour.

9. A method performed by a data processing system for matching a customer service ambassador (CSA) with a customer, the data processing system comprising a processor and memory storing programing for the processor, the method comprising:
receiving by the processor, via a network connection, a first signal comprising a service request for technical assistance from the customer, the service request including a customer identifier associated with the customer;
with the processor, operating a customer data pipeline to determine estimated working hours information for the customer, wherein the processor configures the customer data pipeline to perform:
accessing usage logs for one or more software products to which the customer has access, the usage logs including timestamps indicating when a plurality of users licensed to access the software products performed one or more actions using the software products;
normalizing the timestamps in the usage logs relative to a first time zone to generate normalized usage data; and
analyzing the normalized usage data to generate estimated working hours of the customer relative to the first time zone based on the normalized usage data;
with the processor, operating a customer service ambassadors (CSAs) pipeline based on estimated working hours for a plurality of CSAs by analyzing task records from a CSA information datastore, each task record including an identifier of the CSA that performed a task and timestamp indicating when the CSA performed the task, including normalizing the timestamp associated with each of the task record relative to the first time zone;
accessing, from the memory of the data processing system, information comprising a queue identifying a subset of the plurality of CSAs that are currently available to provide technical assistance to the customer and estimated working hours information for each of the plurality of CSAs;
analyzing, via the processor, the estimated working hours for the customer and the estimated working hours information for each of the plurality of CSAs to produce a compatibility score for each CSA, the compatibility score for a respective one of the CSAs providing an indication of how closely the working hours of the customer and of the respective one of the plurality of CSAs align;
reordering, via the processor, the queue identifying the plurality of CSAs based on the compatibility scores of each of the CSAs;
selecting, via the processor, a CSA from the queue to provide technical assistance to the customer; and
sending, via the network connection, a second signal to a computing device of the CSA that includes an identification of the customer and the service request.

10. The method of claim 9, wherein analyzing the estimated working hours information for the customer and the estimated working hours information for each of the plurality of CSAs to produce a compatibility score for each CSA further comprises:
determining a compatibility score for a respective one of the plurality of CSAs by comparing the estimated working hours for the CSA with the estimated working hours for the customer.

11. The method of claim 10, wherein calculating the compatibility score for a respective one of the CSAs includes instructions further comprises:
determining the compatibility score as $$SCI = 200 \sum\nolimits_{i=0}^{23} \frac{x_i y_i}{x_i + y_i},$$

wherein SCI represents the compatibility score, $x_i$ represents a number of documented CSA activities for a particular hour of a day, and $y_i$ represents a number of documented customer activities for a particular hour of the day, and $x_i$ and $y_i$ are normalized such that sums of $x_i$ are equal to 1 and sums of $y_i$ are each equal to 1.

12. The method of claim 9, wherein reordering the queue of available CSAs further comprises:

splitting the queue into a high compatibility queue and a low compatibility queue;
placing CSAs from the queue into the high compatibility queue responsive to a compatibility score associated with each the respective CSAs being at least a predetermined threshold compatibility score;
placing CSAs from the queue into the low compatibility queue responsive to a compatibility score associated with each the respective CSAs being less than the predetermined threshold compatibility score;
appending the low compatibility queue on an end of the high compatibility queue to produce a reordered queue; and
selecting the CSA from the reordered queue.

13. The method of claim 9, wherein accessing the estimated working hours information for the CSAs further comprises:
selecting task records from a CSA information data store, the task records indicating an action taken by a CSA, a time at which the action was taken, and an identifier of the CSA that performed the action; and
analyzing the task records to determine how many actions were taken by each CSA for each hour.

14. A machine-readable medium storing instructions that, when executed on a processor of a data processing system, cause the data processing system to match a customer service ambassador (CSA) with a customer, by:
receiving with the processor, via a network connection, a first signal comprising a service request for technical assistance from the customer, the service request including a customer identifier associated with the customer;
by the processor, operating a customer data pipeline to determine estimated working hours information for the customer, wherein the processor configures the customer data pipeline for:
accessing usage logs for a plurality of software products to which the customer has access, the usage logs including timestamps indicating when a plurality of users licensed to access the plurality of software products performed one or more actions using the plurality of software products;
normalizing the timestamps in the usage logs relative to a first time zone to generate normalized usage data; and
analyzing the normalized usage data to generate estimated working hours of the customer relative to the first time zone based on the normalized usage data;
with the processor, operating a customer service ambassadors (CSAs) pipeline determine estimated working hours for a plurality of CSAs by analyzing task records from a CSA information datastore, each task record including an identifier of the CSA that performed a task and timestamp indicating when the CSA performed the action, including normalizing the timestamp associated with each of the task record relative to the first time zone;
accessing, from a memory of the data processing system, information comprising a queue identifying a subset of the plurality of CSAs that are currently available to provide technical assistance to the customer and estimated working hours information for each of the plurality of CSAs;
analyzing, via the processor, the estimated working hours for the customer and the estimated working hours information for each of the plurality of CSAs to produce a compatibility score for each CSA, the compatibility score for a respective one of the CSAs providing an indication of how closely the working hours of the customer and of the respective one of the plurality of CSAs align;
reordering, via the processor, the queue identifying the plurality of CSAs based on the compatibility scores of each of the CSAs;
selecting, via the processor, a CSA from the queue to provide technical assistance to the customer; and
sending, via the network connection, a second signal to a computing device of the CSA that includes an identification of the customer and the service request.

15. The machine-readable medium of claim 14, wherein, to analyze the estimated working hours information for the customer and the estimated working hours information for each of the plurality of CSAs to produce a compatibility score for each CSA, the executable instructions further comprise instructions configured to cause the processor to perform operations including:
determining a compatibility score for a respective one of the plurality of CSAs by comparing the estimated working hours for the CSA with the estimated working hours for the customer.

16. The machine-readable medium of claim 15, wherein calculating the compatibility score for a respective one of the CSAs includes instructions configured to cause the processor to perform operations including:
determining the compatibility score as $$SCI = 200 \sum_{i=0}^{23} \frac{x_i y_i}{x_i + y_i},$$

wherein SCI represents the compatibility score, $x_i$ represents a number of documented CSA activities for a particular hour of a day, and $y_i$ represents a number of documented customer activities for a particular hour of the day, and $x_i$ and $y_i$ are normalized such that sums of $x_i$ are equal to 1 and sums of $y_i$ are each equal to 1.

17. The machine-readable medium of claim 14, wherein, to reorder the queue of available CSAs, the executable instructions further comprise instructions configured to cause the processor to perform operations including:
splitting the queue into a high compatibility queue and a low compatibility queue; and
placing CSAs from the queue into the high compatibility queue responsive to a compatibility score associated with each the respective CSAs being at least a predetermined threshold compatibility score;
placing CSAs from the queue into the low compatibility queue responsive to a compatibility score associated with each the respective CSAs being less than the predetermined threshold compatibility score;
appending the low compatibility queue on an end of the high compatibility queue to produce a reordered queue; and
selecting the CSA from the reordered queue.

* * * * *